Feb. 14, 1961 W. E. SHENK 2,972,039
TUBE MILL AND PRESSURE CONTROL THEREFOR
Filed March 13, 1958 4 Sheets-Sheet 1

INVENTOR
WILLIAM E. SHENK
BY Francis J. Klempay
ATTORNEY

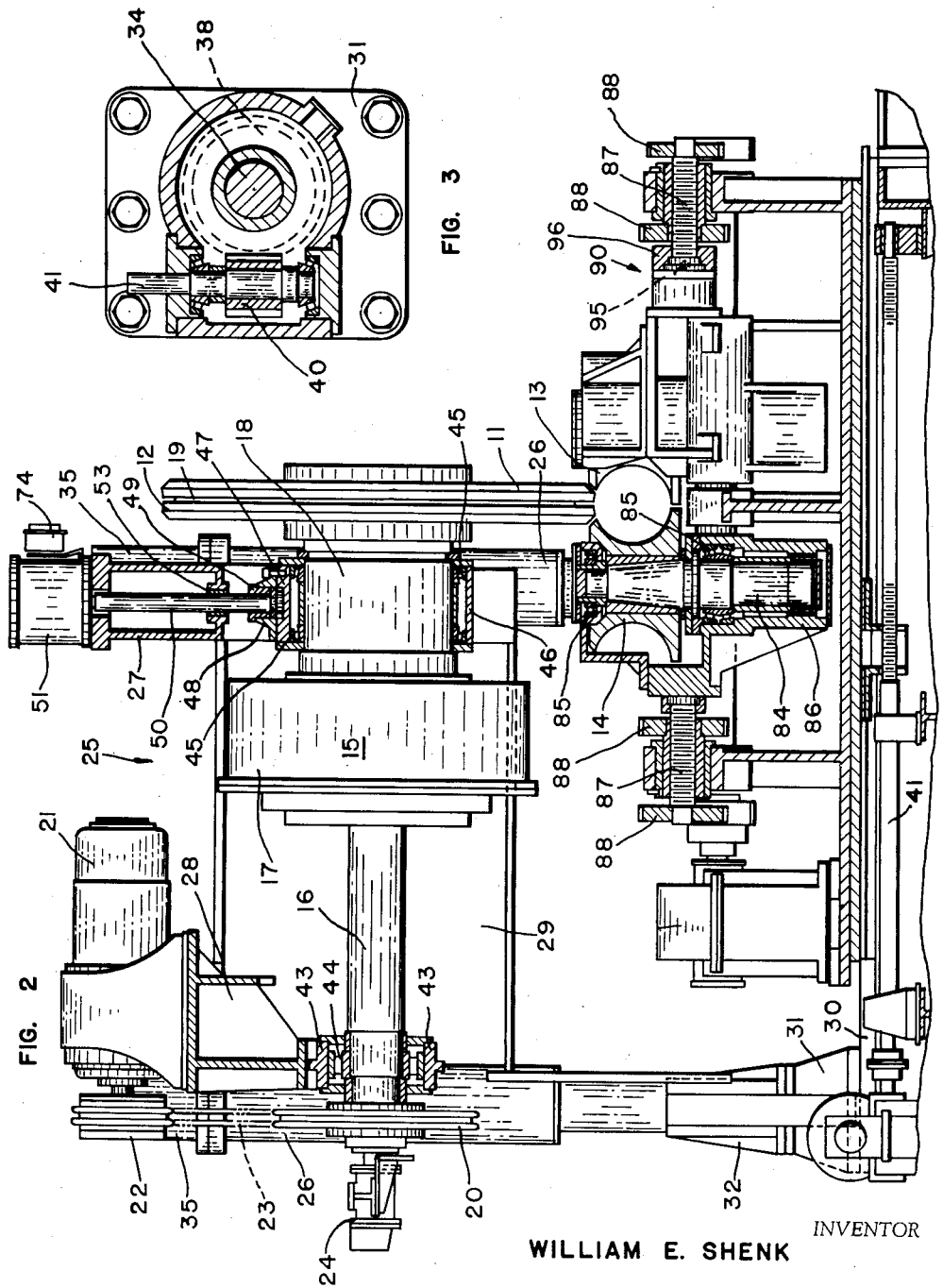

Feb. 14, 1961 W. E. SHENK 2,972,039
TUBE MILL AND PRESSURE CONTROL THEREFOR
Filed March 13, 1958 4 Sheets-Sheet 3
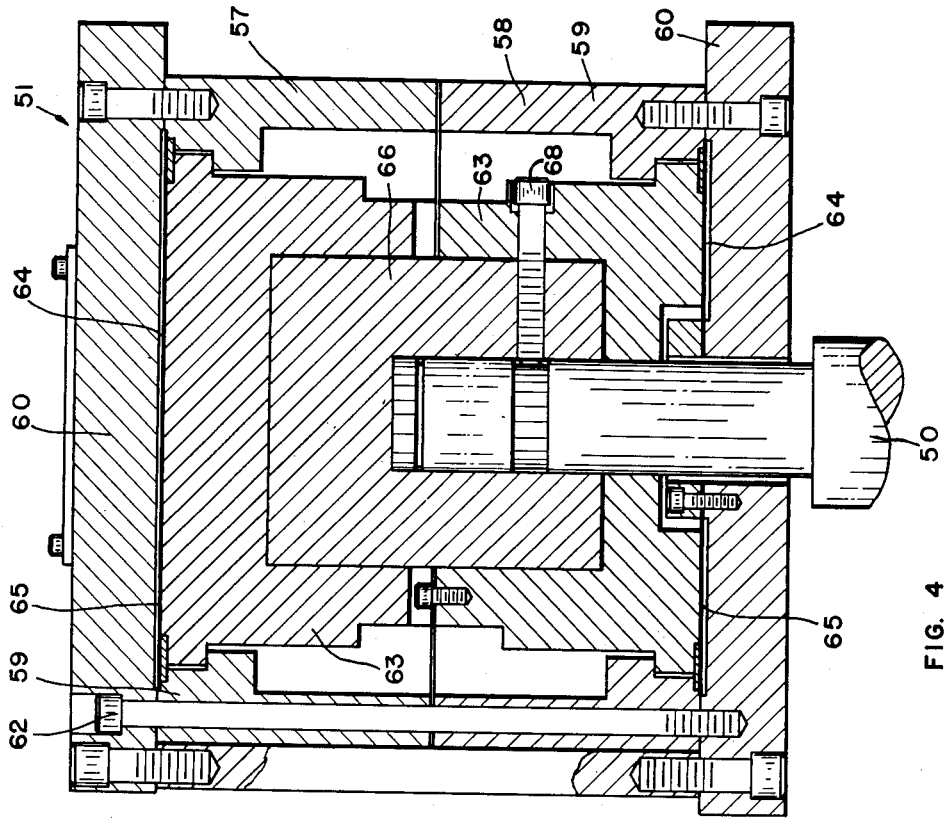
INVENTOR
WILLIAM E. SHENK
BY Francis J. Klempay
ATTORNEY Feb. 14, 1961 W. E. SHENK 2,972,039
TUBE MILL AND PRESSURE CONTROL THEREFOR
Filed March 13, 1958 4 Sheets-Sheet 4

INVENTOR
WILLIAM E. SHENK

BY *Francis J. Klempay*
ATTORNEY

United States Patent Office 2,972,039
Patented Feb. 14, 1961

2,972,039

TUBE MILL AND PRESSURE CONTROL THEREFOR

William E. Shenk, Hubbard, Ohio, assignor to The McKay Machine Company, Youngstown, Ohio, a corporation of Ohio Filed Mar. 13, 1958, Ser. No. 721,313

28 Claims. (Cl. 219—63)

The present invention relates generally to electric resistance welding apparatus of the butt-weld type used to weld an axially extending seam cleft in a cylindrical tube length formed from a continuous length of metal strip. More particularly, the present invention provides an improved tube mill which may be employed in continuous mills for producing steel tubing by the longitudinal-seam butt-welding method.

It is common practice in the butt-welding of steel tubing in a continuous manner to move a continuous length of metal strip through a series of forming rolls toward a welding station, the arrangement being such that by the time the strip reaches the welding station it has been formed into a generally cylindrical shape having an axially extending seam cleft. At the welding station a pair of large rotary electrode wheels engage opposite side edges of the seam cleft and current is caused to flow thereacross so that the edges of the seam are heated to the welding temperature. The welding temperature can be controlled by regulating the amount of electrical energy supplied to the welding electrode wheels in a very accurate fashion by using well-known power regulating control instrumentalities to insure that the edges of the seam are heated to the desired degree. While at the welding station the edges of the cylindrical tube length are forced together under pressure to fuse the same to provide a continuous length of tubing having a strong and unbroken welded seam.

The above described general method of forming and welding continuous metal tubing is, of course, well known in the art and has been successfully practiced for many years. However, as will be understood by those familiar with the welding art, in order to obtain a desired electric resistance weld under all conditions it is advisable to record and/or control certain welding variables such as the welding temperature and the pressure applied to the workpieces during welding as well as the spacing and relative positioning of the workpieces being welded. In electric resistance tube mills weld temperature may be accurately controlled by precisely regulating the power delivered to the seam edges by well-known control means as set forth above and the positioning of the edges of the workpieces can be regulated by proper adjustment of the various forming, guiding and welding roll assemblies which form the cylindrical tube length and cause the butting of the tube edges. To the present time, however, it has been impossible to control the pressure exerted on the edges of seam cleft during welding operations in electric resistance tube mill installations.

It is the primary or ultimate object of the present invention to provide improved tube mill apparatus having means to indicate, record and/or regulate the pressure and the force exerted on the edges of the continuous tube length being welded in such a mill. In this manner control is provided over another variable effecting proper welding operations to provide better welds and/or a more versatile machine adapted to weld materials and workpieces which previously could not be welded by electric resistance tube mills. The pressure exerted on workpieces during welding has long been recognized as a critical feature in welding operations wherein pressure is applied to fuse the softened edges of the workpieces, such as in flash-butt welding of large plates, for example, and the apparatus disclosed and claimed herein allows such teaching to be applied to electric resistance tube mills which has heretofore been impossible.

It should be understood from the outset, however, that although the apparatus disclosed in the illustrated embodiment of the invention is especially adapted for use with an electric resistance tube mill the teachings of the invention are also readily applicable to other types and kinds of metal forming and welding equipment and apparatus. For example, the teachings of the invention may be applied in part to induction type tube mills as will be understood by those familiar with the art upon further consideration of the specification.

Another object of the invention is to provide pressure responsive means which will accurately record and indicate the pressure and force exerted on the edges of the cylindrical tube length by the welding electrode wheels. In any electric resistance tube mill the rotary electrode wheels and the rotary transformer associated therewith are very heavy and of large size and these factors have greatly complicated the problem of providing pressure recording and/or control means for such tube mills. The present control system is arranged so as to be independent of the dead weight of the electrode wheels and rotary transformer in order that an accurate reading of the force actually exerted by the electrode wheels is obtained.

A further and very important object of the invention is to provide a control and/or indicating system responsive to the pressure exerted on the cylindrical tube length by the rotary electrodes which is completely independent of other variables, such as the ambient temperature, for example. In mill operation of such tube mills the ambient temperature is likely to vary over a very wide range and it is mandatory that any control system be independent of such temperature changes if accurate and usable readings and/or control signals are to be obtained. In the present apparatus all of the various variables which may affect the pressure readings are compensated for by providing a plurality of pressure readings which are equally affected by such changes and subtracting them to obtain the desired reading and/or control signal. In this manner any variations in the individual pressure readings due to changes in ancillary conditions will be cancelled out upon subtraction.

Another object of the invention is to provide control and/or indicating apparatus of the character described which, in addition to indicating the pressure exerted on the cylindrical tube length by the electrode wheels, also serves as an indication of the mechanical loading of the various parts of the tube mill. As will be understood, the rotary transformer is relatively long and at certain portions of its length has a relatively thin diameter so that excessive bending moments caused by excessive pressure exerted by the welding electrode wheels on the cylindrical tube length will overload the rotary transformer mechanically and result in damage thereto. The rotary transformer employed in such a tube mill is quite expensive and the pressure control system of the present invention precludes any damage to the transformer due to excessive mechanical forces.

Yet another object of the invention is to provide a simplified control system for recording and/or controlling the pressure and force exerted on a tube length being welded. More particularly, it is an object of the invention to provide a control system utilizing a pair of back-to-back load cells for supporting the rotary electrode wheels and welding transformer and providing the means responsive to the actual pressure exerted by the welding electrode wheels on the workpiece. As will be more fully apparent, the pressure readings from the load cells are automatically subtracted to get the desired reading and this reading may be used to actually control the force exerted by these electrode wheels providing, in essence, a feedback control system.

A further object of the invention is to provide an improved tube mill housing for supporting the electrode wheels and the rotary transformer. As set forth above, the transformer and electrode wheels are of large size and very heavy and the housing of the present invention movably supports the same in a manner which allows accurate measurement of the pressure exerted by the electrode wheels and accurate adjustment thereof.

Another object of the invention is to provide means for recording and/or regulating the pressure applied to the cylindrical tube length by the pressure applying welding roll assembly. This arrangement includes a load cell and provides an indication of the force exerted by such an assembly so that all pressure applying phases of the forming and welding operation are under accurate and precise control.

An ancillary object of the invention is to provide apparatus of the character above described which is characterized by its simplicity, relatively low cost and ease of manufacture and maintenance and yet is capable of accomplishing the desired results.

These, as well as other objects and advantages of the invention, will become more fully apparent upon consideration of the following specification and accompanying drawing wherein there is described and shown an illustrated embodiment of the invention.

In the drawing:

Figure 2 is a side sectional view taken along the section line II—II of Figure 1;

Figure 3 is a plan sectional view taken along the section line III—III of the Figure 1 showing a portion of the mechanism employed for adjusting the tube mill;

Figure 4 is a fragmentary sectional view taken along the section line IV—IV of Figure 1 showing specifically the double load cell arrangement responsive to the pressure exerted by the welding electrodes;

Figure 6:
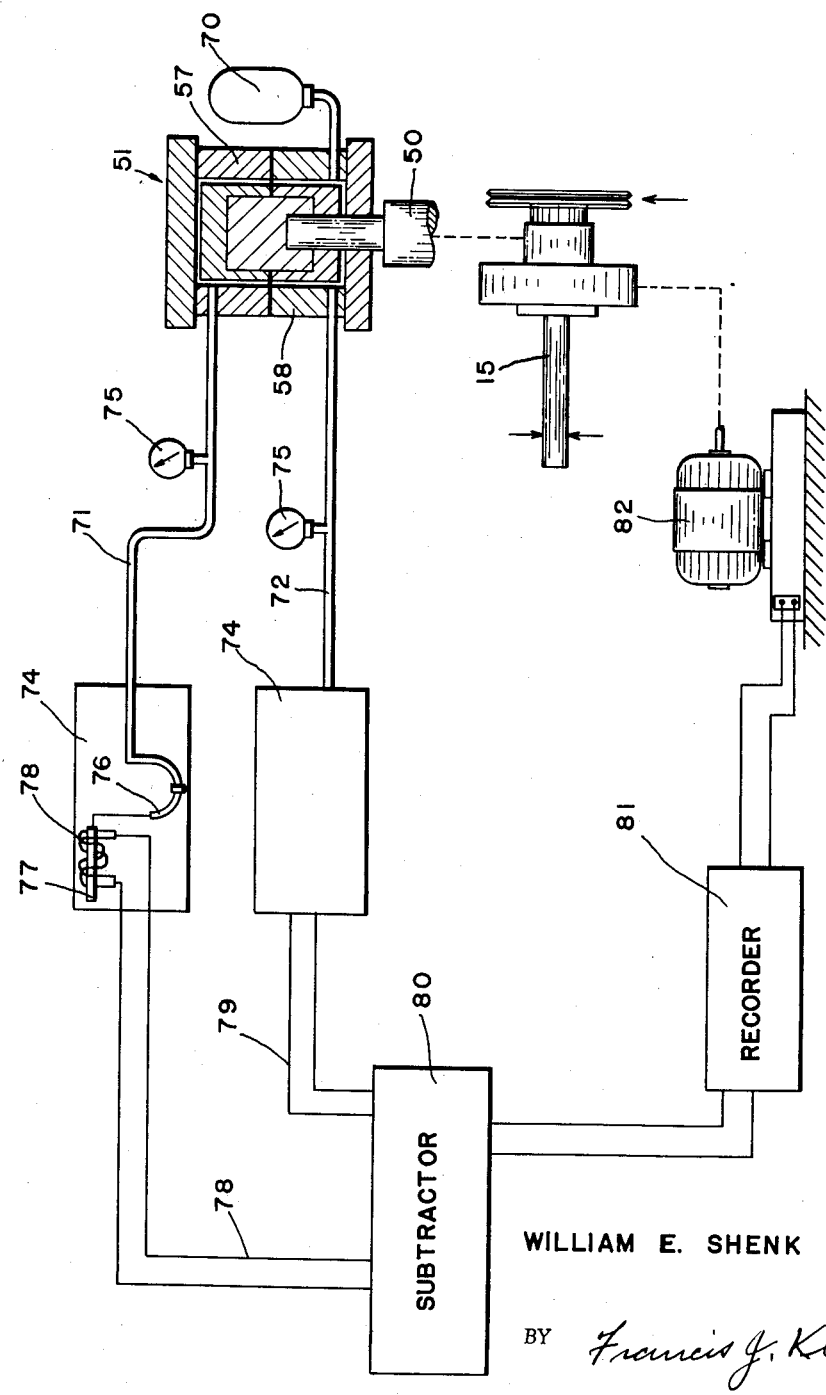

Figure 5 is a fragmentary sectional view depicting in detail the pressure responsive load cell arrangement employed with the forming and/or welding roll assemblies; and Figure 6 is a schematic circuit diagram showing a preferred control circuit and the arrangement of components thereof for recording and regulating the pressure exerted on the cylindrical tube length by the rotary electrodes of an electric resistance tube mill.

Figure 1:
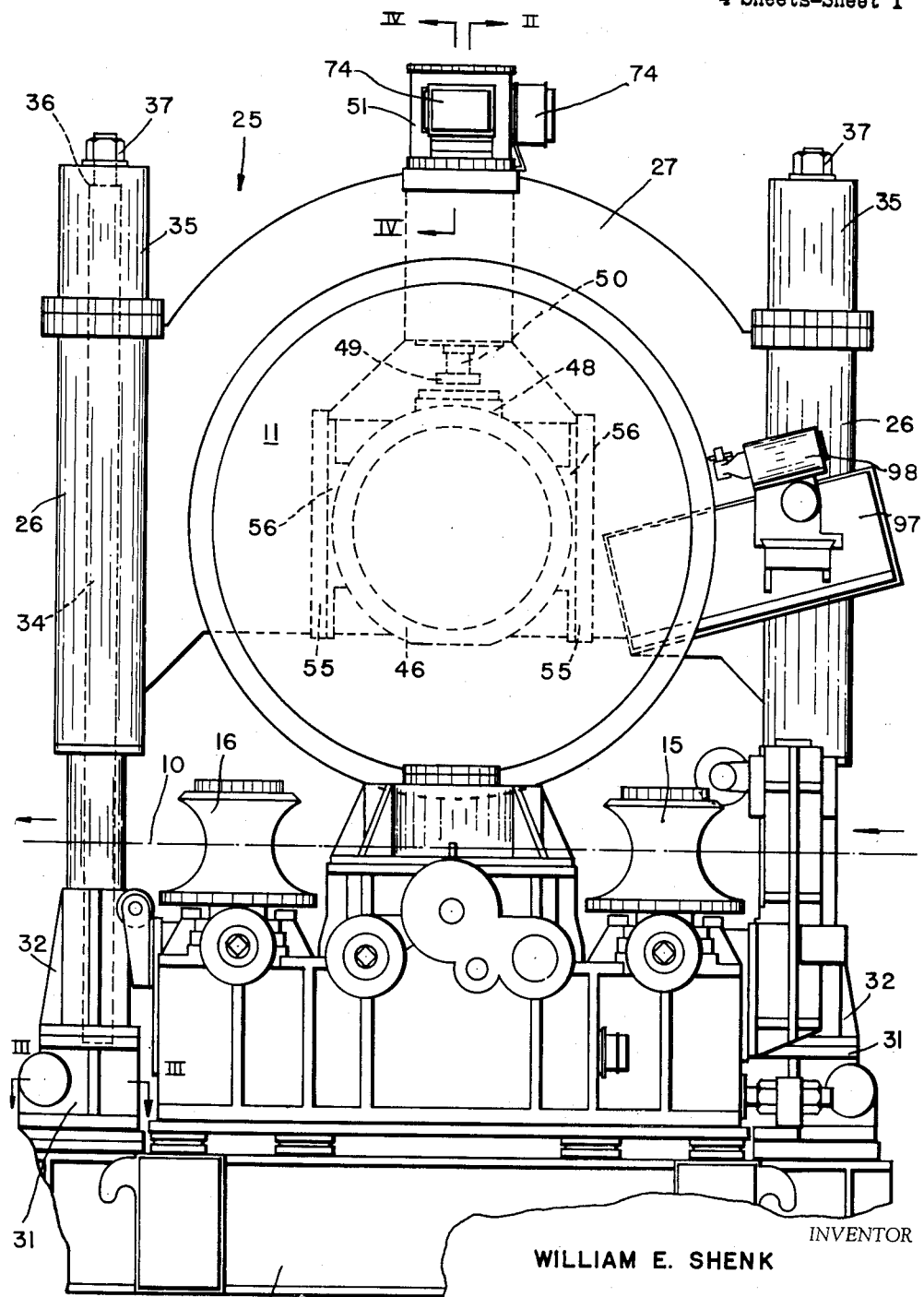
Figure 1 is a front elevation of an assembled tube mill and control means therefor constructed in accordance with the teachings of the present invention.

Referring now to the drawing, and initially to Figures 1 and 2 thereof, there is shown a tube mill installation which is adapted to weld the longitudinally extending seam-cleft in a properly formed cylindrical tube length, not shown, which moves through the tube mill along the pass line 10 in the direction of the arrows. The tube mill comprises a pair of spaced large copper rotary electrode wheels 11 and 12 which are insulated from each other and are adapted to have rolling contact with the opposed edge portions of the tube length to supply electrical energy thereto so that the edges are heated and softened. The tube mill also comprises a pair of welding rolls 13 and 14 disposed in a plane normal to the plane of the rotary electrode wheels that are contoured to engage the major peripheral surface areas of the cylindrical tube length closely adjacent the point of contact of the rotary electrode wheels. The welding rolls are adapted, in cooperation with the rotary electrode wheels, to exert pressure on the softened edges of the cylindrical tube length to cause the same to fuse thereby completing the weld. The tube mill also comprises properly contoured guide roll pairs 15 and 16 which are disposed on opposite sides of the welding station defined by the electrodes and the welding rolls in the path of strip travel. Thus, a properly formed cylindrical tube length moving from right to left in Figure 1 along the pass line 10 is guided and the longitudinal seam-cleft thereof welded.

The tube mill shown may be, and preferably is, a part of a continuous process line for making steel tubing and such a continuous automated process line may include a strip pay-off device, a strip welder, properly contoured forming rolls, the tube mill, a flying saw or similar device and run-out tables, for example. In this manner the tubing can be formed and welded from metal strip in a continuous and automatic manner.

The welding operation itself is carried out in a desired manner by controlling the amount of electrical energy supplied to the welding electrode wheels as is conventional and recording and/or controlling the pressure exerted at the point of weld by the welding electrodes 11 and 12 and the welding rolls 13 and 14. This pressure recording and controlling system forms the heart of the present invention and will be hereinafter more fully explained.

To supply the large electrical potentials needed for the welding operations a rotary transformer 15 is provided which has a main supporting shaft 16 which mounts a relatively large diametered housing 17 and is connected by a throat portion 18 to the electrode wheels 11 and 12 which are separated by insulation 19. The electrode wheels are rigidly mounted on the end of the throat portion 18 with their axes aligned with the axis of the main supporting shaft 16. The entire assembly, including the electrode wheels and the rotary transformer 15, is journaled for rotation in a manner to be later described with the electrode wheels overhanging the pass line of the cylindrical tube length.

The construction of the rotary transformer per se does not form a part of the present invention and the same may be of any well-known construction. However, a preferred type of rotary transformer is shown and claimed in my U.S. Patent No. 2,616,106, entitled "Rotary Electric Resistance Welder," which is assigned to the assignee of the present invention. In this type of transformer the throat serves as a container for the various electrical and coolant conduits and the transformer windings proper are carried within the housing 17. Slip rings, not shown, are positioned behind the housing on the shaft 16 and are adapted to be connected with the primary winding of the transformer and a source of alternating current, not shown. The secondary winding of the transformer has its ends interconnected with the electrode wheels 11 and 12 to complete the secondary electrical circuit as is readily apparent. Keyed to the shaft 16 at the rear end thereof is a large sprocket 20 which is adapted to be driven by a large electrical variable speed motor 21 through a drive connection including a sprocket 22 and continuous chain 23. At the extreme rear end of the shaft 16 there is a rotary fluid coupling 24 which allows coolant to be supplied to the rotary transformer when the same is rotated upon proper actuation of the variable speed drive motor 21.

As previously indicated, the transformer and electrode wheels are relatively large in size and are also characterized by their heavy weight. Any tube mill must have means for properly supporting the transformer and electrode wheels in the position shown. Such supporting means must be able to accurately and firmly hold the transformer and electrode wheels in position but yet should allow adjustment for welding different sized cylindrical tube lengths, reduction in diameter of the welding electrode wheels upon use thereof, set-up adjustment, etc. In the present instance this is accomplished by a housing 25 comprising primarily a unitary casting which is generally rectangular in plan outline and has spaced vertically extending apertured columns 26 at each corner thereof. The front and rear pairs of the columns are interconnected and joined by the longitudinally extending arches 27 and 28, respectively, as shown in Figures 1 and 2 of the drawing while the side pairs of the columns are joined by the integral walls 29. It is thus seen that there is provided a rectangular housing characterized by its strength and rigidity and this housing may be in unitary cast construction if desired. It will be noted that the arches 27 and 28 joining the front and rear pairs of the columns 26 have a cross sectional shape which provides a very rigid structure. The rotary transformer and electrode wheels are supported in depending relation from the spanning arches in a manner to be more fully explained.

The housing 25 is adjustably supported to one side of and generally above the pass line of the cylindrical tube length by means now to be described. Mounted securely on a suitable base 30 at spaced points are four apertured and upwardly extending pedestals 31 which in turn mount four apertured guide holders 32 in the manner shown. Received within the pedestals and the guide holders are the lowered threaded ends of lifting rods 34 (see Figure 1) which extend upwardly through the internal apertures in the columns 26. Each of the columns 26 has bolted to the top flanged surface thereof a cap fitting 35 and it should be apparent that any movement of the cap fittings will cause a like movement of the housing 25. The upper ends of the lifting rods extend into the cap fittings and are shouldered at 36 with the extreme end portions receiving the threaded clamping nuts 37. In this manner of construction any movement of the lifting rods 34 will cause a like movement of the housing 25 and the appurtenant equipment carried thereby.

The lower ends of the lifting rods 34 are received within the pedestals 31 which each journal an annular ring gear 38 whose internal opening is threaded and receives the threaded end of the lifting rod 34 associated therewith. A suitable worm gear 40 meshes with each of the ring gears 38 and a single drive motor 82 (see Figure 6) along with interconnecting drive shafts 41 are employed so that the movement of all of the lifting rods is synchronized as is readily apparent. This general type of housing is ideally suited for tube mill operation and the structure so far described is shown and claimed in U.S. Patent No. 2,824,947 to Halton A. Billeter, entitled "Tube Mill Housing," which is assigned to the assignee of the present invention. This patent is made of record for those desiring a more complete description of the housing assembly and the advantages thereof.

Considering now the arrangement employed for suspending the rotary transformer and electrode wheels, there is provided a generally circular two-piece annular bearing carrier 43. The bearing carrier 43 is generally hollow and mounts a bearing assembly designated by the reference numeral 44 which journals the rear end of the main shaft 16 of the rotary transformer. The annular bearing carrier 43 is provided with a pair of spaced apertured bosses thereon, not shown, and by the use of these bosses is bolted to like integral bosses, not shown, on the lower central portion of the rear arch 28. In this manner the rear end of the transformer is supported for rotation.

The throat portion 18 of the rotary transformer is journaled by a pair of spaced roller bearing assemblies 45 which are carried by an annular bearing carrier 46 encircling the throat in concentric relation therewith. Rigidly attached by a plurality of bolts 47 to the uppermost portion of the annular bearing carrier 46 is a fitting 48 having an arcuately contoured bottom surface which nests with the upper surface of the bearing carrier and this fitting threadably receives a collared nut 49. The collared nut 49 is rigidly and securely attached to the bottom end of an upwardly extending piston rod 50 of a double load cell assembly 51. The load cell assembly 51 forms an integral part of the pressure control and/or recording system of the present invention and the structure and utilization thereof will be hereinafter completely described. It is sufficient for the present to understand that the double load cell is in essence a double acting fluid cylinder whose piston has very limited movement and that the piston rod supports the weight of the forward end of the rotary transformer. The double load cell assembly 51 is mounted on the top of the front arch 27 and the piston rod 50 is guided by a suitable bushing 53 through this arch. As will be observed in Figure 1 of the drawing, the arch 27 is relieved intermediate its ends at 54 to receive the annular bearing carrier 46, the rotary transformer and the piston rod 50 and the edges of the relieved portion 54 are lined with ways 55. The side edges of the annular bearing carrier mount the arcuately formed slides 56 which are guided for limited vertical movement within the ways 55.

In retrospect it will be observed that the rotary transformer is thus rotatably journaled at two spaced points by the bearing carriers 43 and 46. The rear bearing carrier 43 is relatively rigidly mounted and forms in essence a fulcrum while the front bearing carrier is slidably mounted for limited vertical movement by the slides 56, ways 55, piston rod 50 and the double load cell assembly 51.

The double load cell assembly 51 is shown in particular in Figure 4 of the drawing and comprises two load cells 57 and 58 mounted in back-to-back relation. Each of the load cells comprises a generally annular housing 59 and a bottom plate 60 which form the cylinder-like enclosure for the double load cell assembly. The two annular housings 59 are joined by a plurality of circumferentially spaced tie bolts 62 so that the load cells are mounted in the said back-to-back relation. Each of the load cells has a piston 63 which is separated from an annular fluid filled chamber 64 of very thin thickness dimension by a fluid sealing diaphragm 65 so that the pistons act against the fluid contained in said fluid filled chamber 64 of very thin thickness dimension by a fluid sealing diaphragm 65 so that the pistons act against the fluid contained in said fluid filled chambers 64. The pistons 63 of the load cells are generally U-shaped and are attached to connecting block 66 which in turn is rigidly attached to the upper end of the piston rod 50 by the tightening screw 68 in the manner shown.

Load cells themselves are well known in the arts but the double load cell arrangement disclosed is particularly advantageous for supporting the heavy weight of the rotary transformer and electrode wheels. The chambers 64 are of small thickness dimension—preferably only several thousandths of an inch—and when a force is applied to the piston the fluid in the chambers is compressed under the pressure exerted thereon whereby the piston moves a very slight distance. For this reason the front bearing carrier for the rotary transformer is mounted for limited vertical movement as above described. By providing inlets into the chambers 64 of the load cells 57 and 58 and measuring the changes in pressure therein it is possible to directly determine the change in pressures and forces on the cylindrical tube length as applied by the electrode wheels. Such an arrangement is shown in Figure 6 of the drawing.

In the illustrated control system the chamber 64 is in communication with an accumulator 70 and this accumulator is so charged that the force on the fluid exerted thereby is exactly enough to overcome the dead weight of the supported rotary transformer and electrode wheels carried by the piston rod 50. In this manner the interconnected pistons of the load cells are in their rest positions prior to welding operations even though the weight of the transformer and electrode wheels are supported thereby.

Connected to the inlets of the two back-to-back load cells 57 and 58 are the two fluid conduits 71 and 72 leading to identical transducer assemblies 74 adapted to translate pressure signals to electrical signals. Direct reading pressure gauges 75 can be inserted in the conduits 71 and 72 if desired as is readily apparent. The transducer assemblies may be mounted directly on the double load cell assembly in direct communication with the inlets as shown in Figures 1 and 2 of the drawing if desired. The two transducers may be of any well known type—the only requirement being that they be capable of faithfully translating fluid pressures to a proportional electrical signal. A transducer of this type may comprise a Bourdon tube 76 operatively connected with a movable axial core 77 of a differential transformer 78. When the pressure on the fluid in the conduit 71 is increased the Bourdon tube will begin to straighten and this will change the position of the core and consequently the coupling between the windings of the differential transformer. The electrical output of the differential transformer is accordingly changed in response to changes in the force exerted by the welding electrode wheels on the tube length. The outputs of both of the transducers are connected by conductors 78 and 79 to a common subtractor 80 whose function it is to relate the difference between the two outputs of the transducers 74. The two transducers are preferably of identical construction although the internal structure of only one of these components is shown in the drawing. Any well known subtractor arrangement may be used—such as a properly wound transformer, for example—and the output of the subtractor 80 may be relayed to an automatic recorder 81 of the type well known in the art and comprising a driven pen to accurately and precisely record the force exerted by the electrode wheels at the point of weld. The output of the subtractor can also be used as a control signal to actuate control means, such as the motor 82, to control and regulate the forces exerted by the welding electrode wheels on the tube length. The motor 82 is used to raise and lower the housing 25 and the arrangement is in essence a feedback system which will allow accurate and precise control of the welding force. The control means may be such that when the control signal from the subtractor falls without certain preselected limits the motor 82 will be energized to vertically move the electrode wheels until the control signal is again within the prescribed range. Of course, if it is desired only to record the pressures involved during welding operation, the control means for the motor could be eliminated as is readily apparent.

In operation of the apparatus above described, when the electrode wheels bear against the edges of the tube length the force is transferred to the piston rod 50 of the double load cell assembly 51. This force causes an increase in pressure on the entrapped fluid within the chamber 64 of at least one of the load cells 57 and 58. This increase in pressure will be registered on one of the pressure gauges 75 and will further be translated to a proportional electrical signal by one of the transducers 74 in the manner hereinbefore explained. The outputs of both of the transducers 74 are then subtracted and it will be noted that if only one of the load cells 57 or 58 is effected by a force being applied to the electrode wheels and the seam edges of the tube length the output of the subtractor 80 will be proportional to the pressure increase in the effected load cell. The output of the subtractor is at all times proportional to the force exerted by the welding electrode wheels and this signal may be recorded to tell the operator exactly what the pressure conditions are at the point of weld. In this manner another variable which is well known to effect proper welding operations is recorded. If the operator observes that the pressure at the point of weld is too high or too low he may raise or lower the housing as required to correct the pressure applied. Of course, this could be accomplished automatically by providing suitable control means for the motor 82 whereby the same is energized anytime the signal from the subtractor falls above or below preselected limits to bring the same back within the limits as previously described. Other control means which allow automatic control as may appear to those skilled in the control art may be employed as desired.

One of the most important features of the invention is the double load cell assembly and the arrangement for subtracting the outputs thereof. In this manner the control system is completely free and undisturbed by miscellaneous changes in ancillary reference conditions, such as changes in ambient temperature, for example. It will be appreciated that tube mills are usually employed in a mill type of installation and the ambient temperature in the mill is likely to vary widely from hour to hour and day to day. This does not affect the present control system since if the temperature increases or decreases the fluid within the load cells and other apparatus will be caused to expand or contract thereby increasing or decreasing the force on the rigidly secured pistons 63. The change in pressure will be distributed by the solid piston assembly so that each of the load cell readings will be equally affected. Thus the readings observed on the pressure gauges 75 will be equally changed even though there is no change in the force exerted by the electrode wheels on the side edges of the tubing length. But since the readings associated with the two load cells are equally affected the output signal from the subtractor 80 will not change as the changes in the individual load cell signals will cancel out. It is noted that the arrangement disclosed is operative over any range of changes in reference conditions without being affected thereby but yet is characterized by its simplicity in construction and operation.

The double load cell assembly is ideally suited for the use intended in the present invention. It provides accurate pressure or force responsive means while yet supporting the very heavy and large rotary transformer and electrode wheels for limited vertical movement in the manner shown. Other means, such as resistance strain gauges, might be employed in place of the load cells if desired and such change is within the scope of the present invention. The control system also performs another very important function in that the readings thereof also indicate the degree of mechanical loading of the rotary transformer. By observing these readings mechanical overloading of the rotary transformer can be completely eliminated thereby increasing transformer life and mitigating costly repairs.

As previously intimated, the tube mill of the present invention also comprises means for indicating the force exerted on the tube length by the welding roll assembly and this is shown in Figures 2 and 5 of the drawing to which reference is now made. Each of the welding rolls 13 and 14 are journaled on an upwardly extending bearing shaft 84 which is in turn received and journaled within a suitable socket 86 by means of a plurality of annular bearings 85. The socket 86 mounting the welding roll 14 to the left of the pass line of the tubing length is attached to a laterally extending threaded shaft 87 and suitable sprockets 88 are mounted in driving relation therewith whereby upon energization of a suitable driving motor and chain means, not particularly shown, the welding roll 14 is moved toward or away from the path of strip travel. The mounting of the welding roll 13 is similar to that of the welding roll 14 and to avoid unnecessary repetition in the specification the similar structure will not be described although like parts are indicated by like reference numerals. Interconnecting the housing of the socket 86 with the threaded shaft 87 in this welding roll is a load cell generally indicated by the reference numeral 90.

The load cell 90 is particularly shown in Figure 5 of the drawing and comprises an annular outer housing and a base plate 91 which is rigidly attached to the socket 86 and a generally U-shaped piston 92 that is spaced a short distance from the base plate 91 and defines a small chamber 93 in which fluid is entrapped. The U-shaped piston 92 is attached to cover plate 94 having a suitable recess therein to receive a ball 95 in the manner shown. The ball 95 serves as a means for transmitting force from the threaded shaft 87 to the piston 92 and fluid in the chamber 93 of the load cell. A properly apertured fitting 96 is included in the manner shown and supports and protects the inner enlarged end of the threaded shaft 87, the ball 95 and the cover plate 94. This force transferring mechanism allows the force exerted on the threaded shaft 87 to be applied through the ball 95 to the load cell and then to the welding roll 13. The ball and socket arrangement is employed to insure equal distribution of the force on the piston 92 regardless of small movement of the threaded shaft 87 out of alignment with this piston. As previously explained, the chamber in a load cell has a small thickness dimension and the piston will only move a very small distance under very high pressures and it has been found that the entire force applying arrangement from the threaded shaft 87 to the welding roll 13 has enough play or give to compensate for the piston movement of the load cell.

The chamber 93 of the load cell is provided with an inlet and this is in communication with a suitable pressure gauge, not shown. Thus, when the rolls 13 and 14 are moved into pressure contact with a tube length the force exerted thereon will be indicated by the pressure gauge. With this information the operator knows what is happening at the point of weld and he can regulate this pressure by proper energization of the drive means for the sprockets 88 and threaded shafts 87. And it will be apparent that the pressure reading from the load cell 90 may be changed into a proportional electrical signal and this signal employed to control the drive means for the sprockets 88. Further, both the control signals from the subtractor and the load cell 90 could be integrated in some manner to effect the control function if this is desired.

It will be observed that the objects initially set forth have been accomplished. Many changes may be made in the illustrated embodiment of the invention without departing from the clear teachings thereof and accordingly reference should be had to the following appended claims.

I claim:

1. In an electric resistance tube mill having a rotary transformer and a pair of welding electrode wheels supported in vertically disposed relation with respect to a path of strip travel, means for vertically moving said transformer and said welding electrode wheels, means to control said means for vertically moving, and said means to control comprising means responsive to the force exerted on the side edges of a tube length by said electrode wheels.

2. Apparatus according to claim 1 further characterized in that said means responsive comprises a pair of load cells mounted in back-to-back relation.

3. Apparatus according to claim 1 further characterized in that said means responsive comprises a pair of pressure responsive means mounted in back-to-back relation, and subtracting means for subtracting the outputs of said pressure responsive means.

4. Apparatus according to claim 1 further characterized in that means responsive comprises a pair of back-to-back fluid load cells supporting said transformer and said electrode wheels, a separate pressure to electrical transducer associated with each of said load cells, and a subtractor for said separate transducers providing a control signal which is the difference of the signals received from said transducers.

5. Apparatus according to claim 4 further characterized in that said means for vertically moving comprises a motor, and said control signal controlling the energization of said motor.

6. In a tube mill having a rotary transformer and a pair of welding electrode wheels supported in vertically disposed relation with respect to a path of strip travel, means for vertically moving said transformer and said welding electrode wheels, a pressure responsive control system for said tube mill, said control system comprising means responsive to the force exerted on a tube length, and said means responsive directly supporting said welding electrode wheels and said transformer.

7. Apparatus according to claim 6 further characterized in that said pressure responsive device includes a pair of back-to-back load cells supporting said welding electrode wheels and said transformer, and means to subtract the value of the forces exerted on said load cells from each other.

8. Apparatus according to claim 7 further characterized in that said control system further comprises accumulator means associated with one of said load cells for balancing the weight of said transformer and said electrode wheels.

9. In an electric resistance welding station for a continuous butt-weld tube mill the combination of a base, a rotary transformer and an electrode assembly, and means to support and journal said rotary transformer at spaced points whereby said electrode assembly is supported in vertically disposed relation with respect to the pass line of the tube length; the improvement in said means to support comprising a housing having a generally rectangular plan outline, four vertically extending and elongated columns forming the corners of said housing thereby defining front and rear pairs of said columns, an arch generally aligned with and joining said front pair of columns, a similar arch joining said rear pair of columns, vertically extending and spaced parallel sidewalls connecting said front and rear pairs of said columns, said rear arch having a generally semi-circular base portion spanning the rear pair of columns, annular bearing carriers encircling and journaling said rotary transformer at spaced points, the rearwardly disposed of said bearing carriers being attached to the nesting with said semi-circular base portion, and means mounting said other bearing carrier from said arch joining said front pair of housings for limited vertical movement thereof.

10. Apparatus according to claim 9 further characterized in that said arch joining said front pair of columns has a recess therein, the edges of said recess mounting a pair of spaced vertically extending ways, and said bearing carrier mounting a pair of slides on opposite sides thereof guided for sliding movement in said ways.

11. Apparatus according to claim 9 further characterized in that said means mounting comprises a fluid cylinder having a piston rod, said fluid cylinder being mounted on said arch connecting said front pair of columns, and said piston rod of said fluid cylinder mounting said other bearing carrier.

12. Apparatus according to claim 11 further characterized in that said fluid cylinder comprises a pair of interconnected load cells mounted in back-to-back relation.

13. A forming roll assembly for the processing of metal strip which comprises a pair of relatively movable and properly contoured pressure applying rolls, at least one of said rolls being mounted for sliding movement toward and away from the normal path of strip travel, means for slidably moving said roll, means interconnecting said means for moving said roll, and said last mentioned means comprising a pressure responsive load cell.

14. Apparatus according to claim 13 further characterized in that said means interconnecting comprises a driven shaft, said load cell having a piston, and a ball and socket interconnection between said shaft and said piston for transferring pressure from said shaft to said piston.

15. A forming roll assembly for the processing of metal strip comprising a pair of properly contoured forming rolls disposed on opposite sides of the path of strip travel, means mounting at least one of said forming rolls for sliding movement toward and away from said path of strip travel and the other roll, driving means for moving said one of said forming rolls, and a pressure indicating load cell interposed between said one of said forming rolls and said driving means for transferring and indicating the forces exerted on said forming rolls.

16. A tube mill installation for the butt-welding of a continuous tubing length which comprises a pair of electrode wheels and a rotary transformer, means supporting said electrode wheels in vertically disposed relation with respect to the normal path of strip travel, said means supporting comprising a pressure responsive means for indicating the force exerted by said electrode wheels on said tube length, a welding roll assembly disposed adjacent said electrode wheels for engaging said tubing length, said welding roll assembly comprising a pair of relatively movable rolls disposed on opposite sides of said path of strip travel, means for relatively moving said rolls, and said last mentioned means comprising second pressure responsive means for indicating the force exerted on a tubing length by said rolls.

17. In a tube mill having a rotary transformer and a pair of welding electrode wheels supported in vertically disposed relation with respect to a path of strip travel, means for vertically moving said transformer and said welding electrode wheels, a pressure responsive indicating system for said tube mill, said pressure responsive indicating system comprising means responsive to the force exerted on a tube length by said electrode wheels, actuating means for said means for vertically moving, and said actuating means being controlled by said means responsive.

18. In a pressure indicating system for tube welding apparatus comprising a pressure applying member adapted to engage a properly formed tube length, means to support said pressure applying member to one side of the path of travel of said tube length, means responsive to the force exerted by said pressure applying member on said tube length, a pressure indicating device, said means responsive actuating said pressure indicating device, means to move said pressure applying member, actuating means for said means to move, and said actuating means being controlled by said means responsive.

19. In a pressure indicating system for tube welding apparatus comprising a pressure applying member adapted to engage a properly formed tube length, means to support said pressure applying member to one side of the path of travel of said tube length, means responsive to the force exerted by said pressure applying member on said tube length, a pressure indicating device, said means responsive actuating said pressure indicating device, said means responsive forming at least a portion of said means to support, and said means responsive bearing at least a portion of the force applied to said pressure applying member.

20. Apparatus according to claim 19 further characterized in that said means responsive bears at least a portion of the weight of said pressure applying member, accumulator means, and said accumulator means counterbalancing the effect of that portion of said weight carried by said means responsive.

21. Apparatus according to claim 19 further characterized in that said means responsive comprises a load-cell.

22. In a pressure control system for tube welding apparatus comprising a pressure applying member adapted to engage a properly formed tube length, means to support said pressure applying member to one side of the path of travel of said tube length, means to move said pressure applying member, means responsive to the force exerted by said pressure applying member on said tube length, actuating means for said means to move, and said actuating means being controlled by said means responsive.

23. In an electric resistance welding station for a continuous butt-weld tube mill the combination of a rotary transformer and an electrode assembly, a housing, means for raising and lowering said housing, annular bearing carriers encircling and journaling said rotary transformer at spaced points, means mounting one of said bearing carriers to said housing in rigid relation thereto, and means mounting the other of said bearing carriers from said housing for limited vertical movement.

24. A control system for a tube mill comprising a pair of pressure responsive devices mounted in back-to-back relation for measuring the pressure exerted on a tube length at the point of weld, a pressure to electrical transducer associated with each of said pressure responsive devices for changing the pressures developed in said pressure responsive devices to electrical signals, means for subtracting said electrical signals supplied from said transducers, accumulator means communicating with one of said pressure responsive devices, said tube mill having a rotary transformer and a pair of welding electrode wheels, said pressure responsive devices directly supporting said transformer and said electrode wheels, and said accumulator means acting on one of said pressure responsive devices to counterbalance the dead weight of said transformer and said electrode wheels.

25. A working roll assembly for processing metal strip comprising a pair of working rolls disposed on opposite sides of a path of strip travel, means mounting at least one of said working rolls for relative movement toward and away from said path of strip travel and the other of said working rolls, actuating means for moving said one of said working rolls, and said actuating means comprising a pressure responsive load cell for transferring forces exerted on said working rolls.

26. Welding apparatus comprising electrode means adapted to engage a workpiece, means to support said electrode means to one side of said workpiece, said means to support comprising pressure responsive means, said pressure responsive means transmitting at least a portion of the force applied to said electrode means, and said pressure responsive means providing an output which is proportional to the force exerted by said electrode means on said workpiece.

27. Forming apparatus for processing metal workpieces comprising at least one workpiece engaging pressure applying member disposed in adjacent relation with respect to said workpiece, means mounting said pressure applying member for movement toward and away from said workpiece, and said last mentioned means comprising a pressure responsive device for transferring and indicating the forces exerted on said pressure applying member.

28. In an electric resistance welding station the combination of a rotary transformer and an electrode assembly, a housing, means to vertically move said housing, means mounting said rotary transformer and said electrode assembly from said housing, and said means mounting comprising moving means whereby said rotary transformer and said electrode assembly are mounted for limited vertical movement with respect to said housing.

References Cited in the file of this patent

UNITED STATES PATENTS

| 1,700,408 | Holt | Jan. 29, 1929 |
| 2,181,652 | Caputo | Nov. 28, 1939 |
| 2,824,947 | Billetter | Feb. 25, 1958 |
| 2,851,584 | Sciaky | Sept. 9, 1958 |